(12) United States Patent
Kjos et al.

(10) Patent No.: US 11,816,268 B2
(45) Date of Patent: Nov. 14, 2023

(54) ACTUATOR AND RETRACTION MECHANISM FOR FORCE FEEDBACK EXOSKELETON

(71) Applicant: HAPTX, INC., San Luis Obispo, CA (US)

(72) Inventors: Leif Kjos, San Luis Obispo, CA (US); Donald Lee, San Luis Obispo, CA (US); Michael Eichermueller, Arroyo Grande, CA (US)

(73) Assignee: HAPTX, INC., San Luis Obispo, CA (US)

( * ) Notice: Subject to any disclaimer, the term of this patent is extended or adjusted under 35 U.S.C. 154(b) by 191 days.

(21) Appl. No.: 17/497,821

(22) Filed: Oct. 8, 2021

(65) Prior Publication Data

US 2022/0129075 A1 Apr. 28, 2022

Related U.S. Application Data

(60) Provisional application No. 63/104,487, filed on Oct. 22, 2020.

(51) Int. Cl.
| | |
|---|---|
| *G06F 3/01* | (2006.01) |
| *B25J 9/00* | (2006.01) |
| *B25J 13/02* | (2006.01) |

(52) U.S. Cl.
CPC ............ *G06F 3/016* (2013.01); *B25J 9/0006* (2013.01); *G06F 3/014* (2013.01); *B25J 13/025* (2013.01)

(58) Field of Classification Search
CPC ..... B25J 9/0006; B25J 13/025; B25J 19/0004
See application file for complete search history.

(56) References Cited

U.S. PATENT DOCUMENTS

| | | |
|---|---|---|
| 5,184,319 A | 2/1993 | Kramer |
| 5,512,919 A | 4/1996 | Araki |
| (Continued) | | |

FOREIGN PATENT DOCUMENTS

| | | |
|---|---|---|
| DE | 4422971 C2 | 9/2003 |
| JP | 11167419 | 6/1999 |
| (Continued) | | |

OTHER PUBLICATIONS

EPO; Extended European Search Report issued by the European Patent Office for EP Patent Application No. 22180204.4 dated Oct. 4, 2022.

(Continued)

*Primary Examiner* — Jake Cook
(74) *Attorney, Agent, or Firm* — Fitch, Even, Tabin & Flannery LLP

(57) ABSTRACT

Improved actuator and retraction mechanisms for force feedback exoskeletons are described. An actuator assembly for a force-feedback exoskeleton comprising: a rotating body coupled to a tendon and to a spring, said spring configured to produce a torque on the rotating body; and a second body having a surface configured to apply a variable force to a surface of the rotating body by means of a membrane enclosing a volume fluidically coupled to at least one control valve and to a pressurized fluid source, wherein the volume enclosed by the membrane comprises: a first pressure state in which the rotating body contacts the second body; and a second pressure state in which the rotating body does not contact the second body.

20 Claims, 6 Drawing Sheets

(56) References Cited

U.S. PATENT DOCUMENTS

| | | |
|---|---|---|
| 5,631,861 A | 5/1997 | Kramer |
| 5,898,599 A | 4/1999 | Massie |
| 5,961,541 A | 10/1999 | Ferrati |
| 5,963,891 A | 10/1999 | Walker |
| 5,980,256 A | 11/1999 | Carmein |
| 6,070,269 A | 6/2000 | Tardif |
| 6,102,832 A | 8/2000 | Tani |
| 6,126,373 A | 10/2000 | Yee |
| 6,128,004 A | 10/2000 | McDowall |
| 6,135,928 A | 10/2000 | Butterfield |
| 6,141,497 A | 10/2000 | Reinicke |
| 6,386,507 B2 | 5/2002 | Dhuler |
| 6,435,794 B1 | 8/2002 | Springer |
| 6,521,188 B1 | 2/2003 | Webster |
| 7,011,378 B2 | 3/2006 | Maluf |
| 7,046,151 B2 | 5/2006 | Dundon |
| 7,066,896 B1 * | 6/2006 | Kiselik ................ A61H 1/0237 601/5 |
| 7,138,976 B1 | 11/2006 | Bouzit |
| 7,159,618 B2 | 1/2007 | Broyer |
| 7,258,774 B2 | 8/2007 | Chou |
| 7,409,882 B2 | 8/2008 | Massimo |
| 7,918,808 B2 | 4/2011 | Simmons |
| 7,972,718 B2 | 7/2011 | Bailey |
| 8,046,408 B2 | 10/2011 | Torabi |
| 8,096,322 B2 | 1/2012 | Vallet |
| 8,140,339 B2 | 3/2012 | Hernandez-Rebollar |
| 8,156,964 B2 | 4/2012 | Welle |
| 9,299,230 B2 | 3/2016 | Aviles |
| 9,436,338 B2 | 9/2016 | Keller |
| 9,652,037 B2 | 5/2017 | Rubin |
| 9,714,216 B2 | 7/2017 | Hofmann |
| 9,734,393 B2 | 8/2017 | Wang |
| 9,778,746 B2 | 10/2017 | Keller |
| 9,816,799 B2 | 11/2017 | Keller |
| 9,851,799 B2 | 12/2017 | Keller |
| 9,904,358 B2 | 2/2018 | Rubin |
| 9,971,410 B2 | 5/2018 | Keller |
| 9,984,541 B2 | 5/2018 | Aviles |
| 10,013,062 B1 | 7/2018 | Corson |
| 10,013,064 B2 | 7/2018 | Keller |
| 10,025,386 B2 | 7/2018 | Keller |
| 10,025,387 B2 | 7/2018 | Keller |
| 10,032,347 B2 | 7/2018 | Keller |
| 10,067,007 B2 | 9/2018 | Keller |
| 10,088,902 B2 | 10/2018 | Keller |
| 10,158,277 B2 | 12/2018 | Chun |
| 10,197,459 B2 | 2/2019 | Keller |
| 10,209,775 B2 | 2/2019 | Keller |
| 10,216,272 B2 | 2/2019 | Keller |
| 10,222,859 B2 | 3/2019 | Rubin |
| 10,234,950 B1 | 3/2019 | Keller |
| 10,240,622 B1 | 3/2019 | Lindsay |
| 10,241,567 B2 | 3/2019 | Gopalakrishnan |
| 10,261,592 B2 | 4/2019 | Keller |
| 10,281,982 B2 | 5/2019 | Keller |
| 10,283,232 B2 | 5/2019 | Keller |
| 10,310,608 B1 | 6/2019 | Keller |
| 10,310,610 B2 | 6/2019 | Krogstad |
| 10,310,804 B2 | 6/2019 | Keller |
| 10,317,999 B2 | 6/2019 | Ahne |
| 10,324,530 B2 | 6/2019 | Keller |
| 10,331,206 B2 | 6/2019 | Keller |
| 10,347,094 B1 | 7/2019 | Keller |
| 10,353,466 B1 | 7/2019 | Keller |
| 10,372,213 B2 | 8/2019 | Keller |
| 10,372,219 B1 | 8/2019 | West |
| 10,409,375 B1 | 9/2019 | Higgins |
| 10,422,362 B2 | 9/2019 | Ochs |
| 10,422,637 B1 | 9/2019 | Keller |
| 10,423,227 B2 | 9/2019 | Gu |
| 10,429,210 B1 | 10/2019 | Keller |
| 10,458,864 B1 | 10/2019 | Keller |
| 10,460,873 B2 | 10/2019 | Keller |
| 10,474,236 B1 | 11/2019 | Stewart |
| 10,481,262 B1 | 11/2019 | Desalvo |
| 10,488,932 B1 | 11/2019 | Keller |
| 10,496,169 B2 | 12/2019 | Keller |
| 10,502,327 B1 | 12/2019 | Keller |
| 10,502,643 B2 | 12/2019 | Keller |
| 10,514,111 B2 | 12/2019 | Keller |
| 10,514,765 B1 | 12/2019 | Keller |
| 10,528,138 B2 | 1/2020 | Keller |
| 10,528,143 B2 | 1/2020 | Keller |
| 10,528,151 B1 | 1/2020 | Keller |
| 10,534,433 B2 | 1/2020 | Agarwal |
| 10,540,870 B1 | 1/2020 | West |
| 10,546,471 B1 | 1/2020 | West |
| 10,551,916 B2 | 2/2020 | Chen |
| 10,557,699 B1 | 2/2020 | Keller |
| 10,558,036 B2 | 2/2020 | Keller |
| 10,563,776 B1 | 2/2020 | Lindsay |
| 10,564,722 B2 | 2/2020 | Keller |
| 10,572,014 B2 | 2/2020 | Keller |
| 10,572,024 B1 | 2/2020 | Saba |
| 10,585,479 B2 | 3/2020 | Keller |
| 10,591,933 B1 | 3/2020 | Keller |
| 10,599,217 B1 | 3/2020 | Keller |
| 10,635,172 B1 | 4/2020 | Keller |
| 10,648,573 B2 | 5/2020 | Keller |
| 10,678,335 B2 | 6/2020 | Keller |
| 10,705,606 B1 | 7/2020 | Colonnese |
| 10,712,818 B2 | 7/2020 | Keller |
| 10,725,541 B1 | 7/2020 | Desalvo |
| 10,732,280 B1 | 8/2020 | Desalvo |
| 10,732,711 B2 | 8/2020 | Rubin |
| 10,732,712 B2 | 8/2020 | Keller |
| 10,747,332 B2 | 8/2020 | Wang |
| 10,748,393 B1 | 8/2020 | Keller |
| 10,779,583 B2 | 9/2020 | Keller |
| 10,782,782 B1 | 9/2020 | Desalvo |
| 10,802,586 B1 | 10/2020 | Zhao |
| 10,802,657 B1 | 10/2020 | Ahne |
| 10,802,658 B2 | 10/2020 | Ahne |
| 10,809,804 B2 | 10/2020 | Goupil |
| 10,817,049 B1 | 10/2020 | Keller |
| 10,818,433 B1 | 10/2020 | Keller |
| 10,824,231 B1 | 11/2020 | Desalvo |
| 10,838,493 B2 | 11/2020 | Desalvo |
| 10,845,212 B1 | 11/2020 | Turkyilmaz |
| 10,852,826 B1 | 12/2020 | Cox |
| 10,852,827 B1 | 12/2020 | Bochereau |
| 10,866,035 B1 | 12/2020 | Keller |
| 10,907,658 B1 | 2/2021 | Corson |
| 10,942,572 B1 | 3/2021 | Israr |
| 10,948,989 B1 | 3/2021 | Blumenschein |
| 10,955,932 B1 | 3/2021 | Saba |
| 10,962,124 B1 | 3/2021 | Stanley |
| 10,976,826 B1 | 4/2021 | Keller |
| 10,989,233 B2 | 4/2021 | Ochs |
| 10,989,330 B1 | 4/2021 | Keller |
| 10,996,756 B1 | 5/2021 | Ahne |
| 11,009,959 B1 | 5/2021 | Piazza |
| 11,011,033 B1 | 5/2021 | Piazza |
| 11,015,926 B1 | 5/2021 | Keller |
| 11,015,989 B2 | 5/2021 | Keller |
| 11,029,757 B1 | 6/2021 | Chen |
| 11,054,056 B1 | 7/2021 | Glick |
| 11,060,621 B2 | 7/2021 | Desalvo |
| 11,061,472 B2 | 7/2021 | Rubin |
| 11,062,573 B2 | 7/2021 | Young |
| 11,068,057 B1 | 7/2021 | Keller |
| 11,069,207 B2 | 7/2021 | West |
| 11,084,031 B1 | 8/2021 | Keller |
| 11,093,035 B1 | 8/2021 | Ng |
| 11,098,737 B1 | 8/2021 | Glick |
| 11,112,868 B1 | 9/2021 | Stewart |
| 11,125,255 B1 | 9/2021 | Stanley |
| 11,131,331 B2 | 9/2021 | Stanley |
| 11,132,058 B1 | 9/2021 | Gupta |
| 11,132,061 B1 | 9/2021 | Stanley |
| 11,143,218 B1 | 10/2021 | Glick |
| 11,193,597 B1 | 12/2021 | Keller |
| 11,579,692 B2 | 2/2023 | Rubin |

(56) References Cited

U.S. PATENT DOCUMENTS

| | | |
|---|---|---|
| 2001/0003712 A1 | 6/2001 | Roelofs |
| 2003/0025595 A1 | 2/2003 | Langberg |
| 2003/0030397 A1 | 2/2003 | Simmons |
| 2003/0115954 A1 | 6/2003 | Zemlyakov |
| 2006/0017654 A1 | 1/2006 | Romo |
| 2006/0115348 A1 | 6/2006 | Kramer |
| 2007/0225620 A1 | 9/2007 | Carignan |
| 2008/0102991 A1 | 5/2008 | Hawkins |
| 2009/0248202 A1 | 10/2009 | Osuka |
| 2009/0250267 A1 | 10/2009 | Heubel |
| 2009/0312817 A1 | 12/2009 | Hogle |
| 2010/0093559 A1 | 4/2010 | Fan |
| 2010/0165784 A1 | 7/2010 | Jovanovich |
| 2011/0016609 A1 | 1/2011 | Phelps |
| 2011/0023970 A1 | 2/2011 | Rapp |
| 2011/0067157 A1 | 3/2011 | Xiao |
| 2012/0065026 A1 | 3/2012 | Land |
| 2012/0156661 A1 | 6/2012 | Smith |
| 2012/0182135 A1 | 7/2012 | Kusuura |
| 2013/0158444 A1 | 6/2013 | Herr |
| 2013/0231595 A1 | 9/2013 | Zoss |
| 2014/0214206 A1* | 7/2014 | Steinberg ............... B25J 13/025 700/258 |
| 2014/0274397 A1 | 9/2014 | Sebastian |
| 2014/0277739 A1 | 9/2014 | Kornbluh |
| 2014/0358290 A1 | 12/2014 | Kazerooni |
| 2015/0025423 A1 | 1/2015 | Caires |
| 2015/0040288 A1 | 2/2015 | Gaff |
| 2015/0289995 A1 | 10/2015 | Wilkinson |
| 2015/0321339 A1 | 11/2015 | Asbeck |
| 2016/0041581 A1 | 2/2016 | Piccionelli |
| 2016/0139666 A1 | 5/2016 | Rubin |
| 2016/0246369 A1 | 8/2016 | Osman |
| 2016/0259417 A1 | 9/2016 | Gu |
| 2016/0266645 A1 | 9/2016 | Marozau |
| 2016/0342209 A1 | 11/2016 | Provancher |
| 2017/0083085 A1 | 3/2017 | Rubin |
| 2017/0097680 A1 | 4/2017 | Keller |
| 2017/0131769 A1 | 5/2017 | Keller et al. |
| 2017/0131770 A1 | 5/2017 | Keller et al. |
| 2017/0160807 A1 | 6/2017 | Keller |
| 2017/0168565 A1 | 6/2017 | Cohen |
| 2017/0168576 A1 | 6/2017 | Keller |
| 2017/0178471 A1 | 6/2017 | Levesque |
| 2017/0242477 A1 | 8/2017 | Rubin |
| 2017/0300115 A1 | 10/2017 | Kerr |
| 2018/0098583 A1 | 4/2018 | Keller |
| 2018/0179051 A1 | 6/2018 | Keller |
| 2018/0194369 A1 | 7/2018 | Lisseman |
| 2018/0322444 A1 | 11/2018 | Todeschini |
| 2018/0335841 A1 | 11/2018 | Rubin |
| 2018/0335842 A1 | 11/2018 | Rubin |
| 2019/0086996 A1 | 3/2019 | Bahrami |
| 2019/0163269 A1 | 5/2019 | Rubin |
| 2019/0176320 A1 | 6/2019 | Smith |
| 2019/0204921 A1 | 7/2019 | Goupil |
| 2020/0201431 A1 | 6/2020 | Rubin |
| 2020/0219370 A1 | 7/2020 | West |
| 2020/0250942 A1 | 8/2020 | Young |
| 2020/0272235 A1 | 8/2020 | Ng |
| 2021/0018102 A1 | 1/2021 | Stanley |
| 2021/0081048 A1 | 3/2021 | Sedal |
| 2021/0096648 A1 | 4/2021 | Summit |
| 2021/0217246 A1 | 7/2021 | Osborn |
| 2021/0303065 A1 | 9/2021 | Rubin |
| 2021/0311553 A1 | 10/2021 | Keller |
| 2021/0354137 A1 | 11/2021 | Stanley |
| 2023/0205315 A1 | 6/2023 | Rubin |

FOREIGN PATENT DOCUMENTS

| | | |
|---|---|---|
| JP | 2012074076 | 4/2012 |
| KR | 20100091382 | 8/2010 |
| KR | 1020130086235 | 7/2013 |
| KR | 1020130101367 | 9/2013 |
| WO | 2010025409 | 3/2010 |
| WO | 2010049092 | 5/2010 |
| WO | 2012082072 | 6/2012 |
| WO | 2020081384 | 4/2020 |

OTHER PUBLICATIONS

Kratchman et al; "Modeling Pneumatic Bubble Displacements with Membrane Theory"; Haptics Symposium, 2010 IEEE; Mar. 25, 2010; pp. 327-224.

USPTO: Notice of Allowance issued in U.S. Appl. No. 17/345,973 dated Oct. 6, 2022.

PCT; International Search Report and Written Opinion of the International Searching Authority for PCT/US2021/054314 dated Jan. 24, 2022.

Communication Pursuant to Article 94(3) EPC for European Patent Application No. 14819570.4 mailed from the European Patent Office dated Jan. 23, 2020.

Communication Pursuant to Rule 164(1) EPC and Supplementary Partial European Search Report for European Patent Application No. 14819570.4 mailed from the European Patent Office dated Sep. 26, 2016.

Dexta Robotics; "Exoskeleton Glove Adds Physical Experience to Virtual Reality (Video)"; Yahoo Tech; https://www.yahoo.com/tech/exoskeleton-glove-adds-physical-experience-to-virtual-reality; Aug. 24, 2016; downloaded Aug. 30, 2016; pp. 1 and 2.

EP; Partial Supplementary European Search Report issued in EP Patent Application No. 18896343.3 mailed from the European Patent Office dated Sep. 3, 2021.

Extended European Search Report for European Patent Application No. 14819570.4 mailed from the European Patent Office dated Jan. 16, 2017.

Goupil; U.S. Appl. No. 16/235,588, filed Dec. 28, 2018.

Grover et al.; "Development and Multiplexed Control of Latching Pneumatic Valves Using Microfluidic Logical Structures"; Lab Chip; Apr. 6, 2006; pp. 623-631.

International Search Report and Written Opinion of the International Searching Authority for PCT/US14/44735 dated Dec. 17, 2014.

King et al; "A Pneumatic Haptic Feedback Actuator Array for Robotic Surgery or Simulation"; Medicine Meets Virtual Reality 15; IOS Press, 2007; pp. 217-222.

Leithinger et al; "inFORM"; MIT Media Lab Tangible Media Group; 2013; http://tangible.media.mit.edu/project/inform/; downloaded Jun. 1, 2016; 2 pages.

Morales; "Pneumatic Multiplexer—3d printed"; Instructables; http://www.instructables.com/id/Pneumatic-Multiplexer/; 2016 Autodesk, Inc.; downloaded Jun. 7, 2016; 6 pages.

PCT; International Search Report and Written Opinion of the International Searching Authority for PCT/US2018/030106 mailed from the International Searching Authority dated Aug. 14, 2018.

PCT; International Search Report and Written Opinion of the International Searching Authority for PCT/US2018/067941 dated Apr. 23, 2019.

Rubin; U.S. Appl. No. 17/345,973, filed Jun. 11, 2021.
Rubin; U.S. Appl. No. 14/981,414, filed Dec. 28, 2015.
Rubin; U.S. Appl. No. 15/372,362, filed Dec. 7, 2016.
Rubin; U.S. Appl. No. 15/591,019, filed May 9, 2017.
Rubin; U.S. Appl. No. 15/599,470, filed May 19, 2017.
Rubin; U.S. Appl. No. 15/599,471, filed May 19, 2017.
Rubin; U.S. Appl. No. 16/245,145, filed Jan. 10, 2019.

Someya; "Building Bionic Skin, How Flexible Electronics Can Provide E-Skins for Human Spectrum"; IEEE.Org; Sep. 2013; pp. 51-56.

USPTO; Final Office Action issued in U.S. Appl. No. 15/599,470 dated May 1, 2019.

USPTO; Final Office Action issued in U.S. Appl. No. 15/599,471 dated Apr. 16, 2019.

USPTO; Non-Final Office Action issued in U.S. Appl. No. 16/235,588 dated Mar. 18, 2020.

(56) References Cited

OTHER PUBLICATIONS

USPTO; Non-final Office Action issued in U.S. Appl. No. 14/981,414 dated Oct. 6, 2016.
USPTO; Non-Final Office Action issued in U.S. Appl. No. 15/591,019 dated Apr. 3, 2018.
USPTO; Non-Final Office Action issued in U.S. Appl. No. 15/599,471 dated Sep. 19, 2018.
USPTO; Non-Final Office Action issued in U.S. Appl. No. 16/245,145 dated Jan. 9, 2020.
USPTO; Non-Final Office Action issued in U.S. Appl. No. 15/599,470 dated Oct. 10, 2018.
USPTO; Notice of Allowance issued in U.S. Appl. No. 15/372,362 dated Oct. 11, 2017.
USPTO; Notice of Allowance issued in U.S. Appl. No. 15/591,019 dated Nov. 14, 2018.
USPTO; Notice of Allowance issued in U.S. Appl. No. 16/235,588 dated Jun. 26, 2020.
USPTO; Notice of Allowance issued in U.S. Appl. No. 16/245,145 dated May 28, 2020.
USPTO; Notice of Allowance issued in U.S. Appl. No. 16/807,029 dated Mar. 17, 2021.
USPTO: Notice of Allowance issued in U.S. Appl. No. 14/981,414 dated Mar. 10, 2017.
Rubin; U.S. Appl. No. 16/807,029, filed Mar. 2, 2020.
Rubin; U.S. Appl. No. 18/154,824, filed Jan. 14, 2023.
EPO; Extended European Search Report issued by the European Patent Office for EP Patent Application No. 18896343.3 dated Nov. 9, 2021.
USPTO; Notice of Allowance issued in U.S. Appl. No. 18/154,824 dated Jul. 10, 2023.
PCT; International Search Report and Written Opinion of the International Searching Authority for PCT/US23/19494 dated Jul. 18, 2023.

\* cited by examiner

ACTUATOR AND RETRACTION MECHANISM FOR FORCE FEEDBACK EXOSKELETON

This application claims the benefit of U.S. Provisional Application No. 63/104,487, filed Oct. 22, 2020, for ACTUATOR AND RETRACTION MECHANISM FOR FORCE FEEDBACK EXOSKELETON, which is incorporated in its entirety herein by reference.

This application relates to U.S. application Ser. No. 15/599,471, now abandoned, U.S. application Ser. No. 16/235,588, now U.S. Pat. No. 10,809,804, and U.S. patent application Ser. No. 15/591,019, now U.S. Pat. No. 10,222,859, all of which are incorporated in their entirety herein by reference.

BACKGROUND OF THE INVENTION

1. Field of the Invention

The present invention relates generally to providing haptic feedback via a force feedback exoskeleton, and more specifically to providing haptic feedback to a hand using a force feedback exoskeleton.

2. Discussion of the Related Art

Various systems and processes are known in the art for providing haptic feedback. Haptic feedback systems interact with a user's sense of touch by applying mechanical forces, vibrations, or motions. Force feedback exoskeletons are a subcategory of haptic feedback systems that produce a net force on a body segment of a user, such as a finger.

Force feedback exoskeletons incorporate one or more actuators to produce said net force. These actuators can be broadly characterized as active or passive. Active force feedback actuators (as for example described in U.S. Pat. No. 10,423,227) are differentiated by their ability to perform work on the body of a user. This approach enables improved rendering of some haptic effects, such as object weight, but introduces several disadvantages, chiefly: larger size and weight, more complex control models, and the possibility of injuring a user by applying excessive forces to the user's body or forcing a body segment of the user outside of its natural range of motion.

Passive force feedback actuators (as for example described in U.S. Pat. No. 10,534,433 or U.S. patent application Ser. No. 15/599,471) use a resistive mechanism, such as a brake, to dissipate energy. Passive force feedback actuators cannot perform work on a user's body. Passive actuators may generally be significantly more compact than active actuators and are inherently safe due to their exclusively dissipative mode of action. However, passive force feedback actuators still present several key barriers to commercial viability that have yet to be addressed in the prior art, including: integration of a force feedback actuator and retraction mechanism in a miniaturized package which can comfortably be worn on the hand, and design of a force feedback actuator and retraction mechanism capable of functioning reliability over hundreds of thousands of actuation cycles. Thus, there remains a need for an improved actuator and retraction mechanism for force feedback exoskeletons.

SUMMARY

An apparatus, system, and method for providing haptic feedback to a hand using a force feedback exoskeleton are described. One or more embodiments of the apparatus, system, and method include a first rotating body coupled to a tendon and to a spring, the spring configured to produce a torque on the rotating body and a second body having a surface configured to apply a variable force to a surface of the rotating body by means of a membrane enclosing a volume fluidically coupled to at least one control valve and to a pressurized fluid source, wherein the volume enclosed by the membrane comprises a first pressure state in which the rotating body contacts the second body and a second pressure state in which the rotating body does not contact the second body.

A method, apparatus, non-transitory computer readable medium, and system for providing haptic feedback to a hand using a force feedback exoskeleton are described. One or more embodiments of the method, apparatus, non-transitory computer readable medium, and system include providing an actuator assembly mechanically coupled to a tendon such that a length of the tendon extending from the actuator assembly is increasable and wherein an actuator of the actuator assembly is coupled to a pressurized fluid source configured to change pressure in an enclosed cavity of the actuator assembly, coupling an end of the tendon extending from the actuator assembly to the external member, activating the pressurized fluid source to provide a first pressure in the cavity, whereby the tensile force on the tendon is unaffected by the actuator when cavity has the first pressure, and activating the pressurized fluid source to provide a second pressure in the cavity different from the first pressure, whereby the actuator applies a braking force to the mechanical coupling, whereby tensile force on the tendon is affected by the actuator.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth.

In other instances, well-known structures, materials, or operations are not shown or described in detail to avoid obscuring aspects of the invention. A haptic feedback glove may include a soft glove made of a flexible material, thimbles over each finger and thumb, and tendons coupled to each finger thimble. One or more actuators may be connected to each tendon, so that the tendons may be used to apply pressure to the fingers. Tactors in the finger thimbles and on palm panels may also be used to provide haptic feedback.

Figure 1:
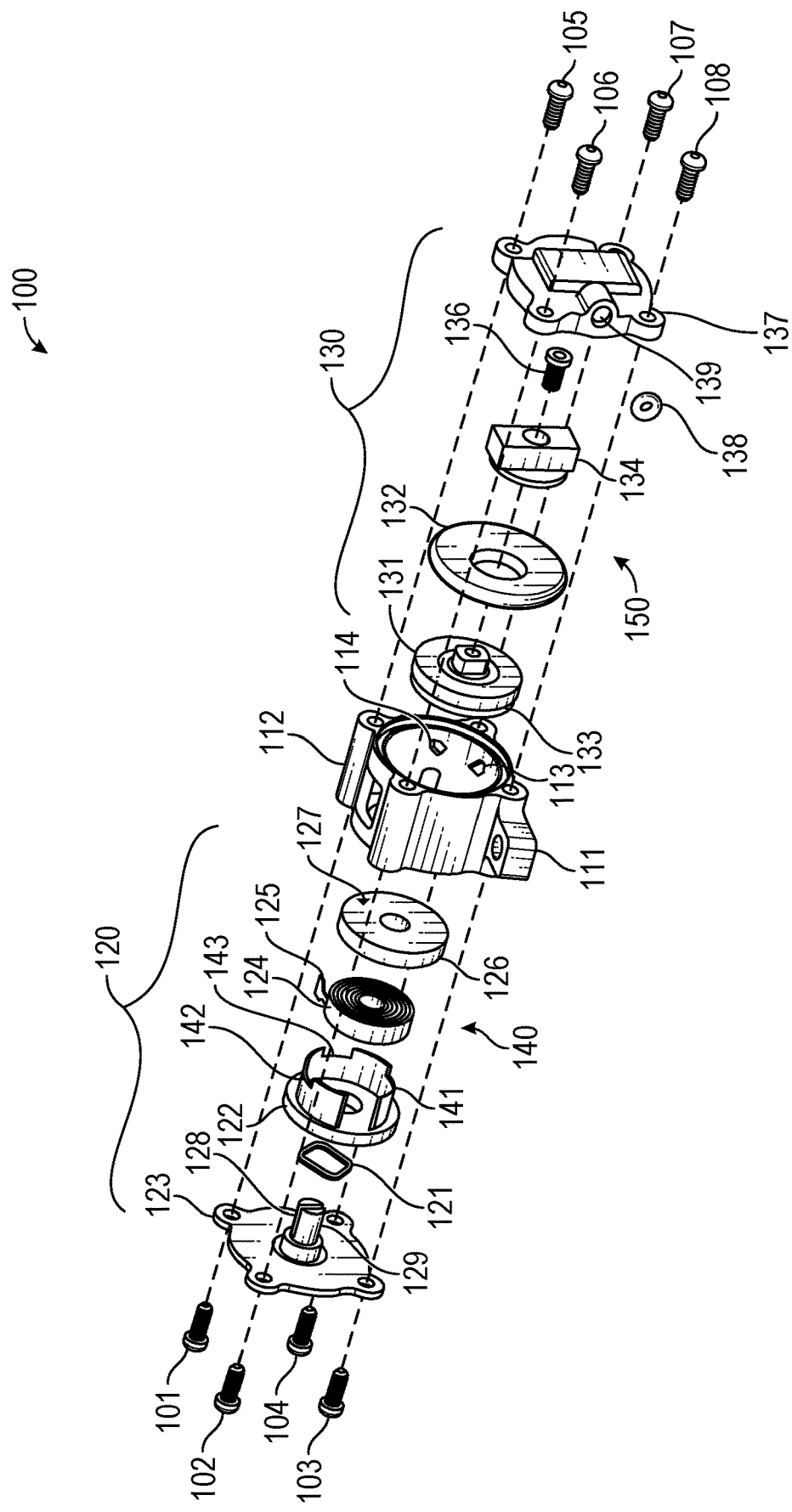
FIG. 1 is an exploded perspective view of a force feedback actuator assembly in accordance with one embodiment.

FIG. 1 illustrates an example of a force feedback actuator assembly 100 in accordance with one embodiment. A retraction assembly 120 and a brake assembly 130 are secured to a main casing 112 by a plurality of fasteners 101-108, such that the two assemblies are substantially co-axial and parallel to each other and brake pad 133 of brake assembly 130 is adjacent to rotor surface 127 of retraction assembly 120.

Power spring 124 is enclosed by spring casing 122, which is coupled to spring casing cap 126. Tab 125 of power spring 124 is inserted into slot 128 of arbor casing 123. Power spring assembly 140 (comprising spring casing 122, power spring 124, and spring casing cap 126, also referred to as a rotating body) is free to rotate about arbor post 129 of arbor casing 123.

Figure 3:
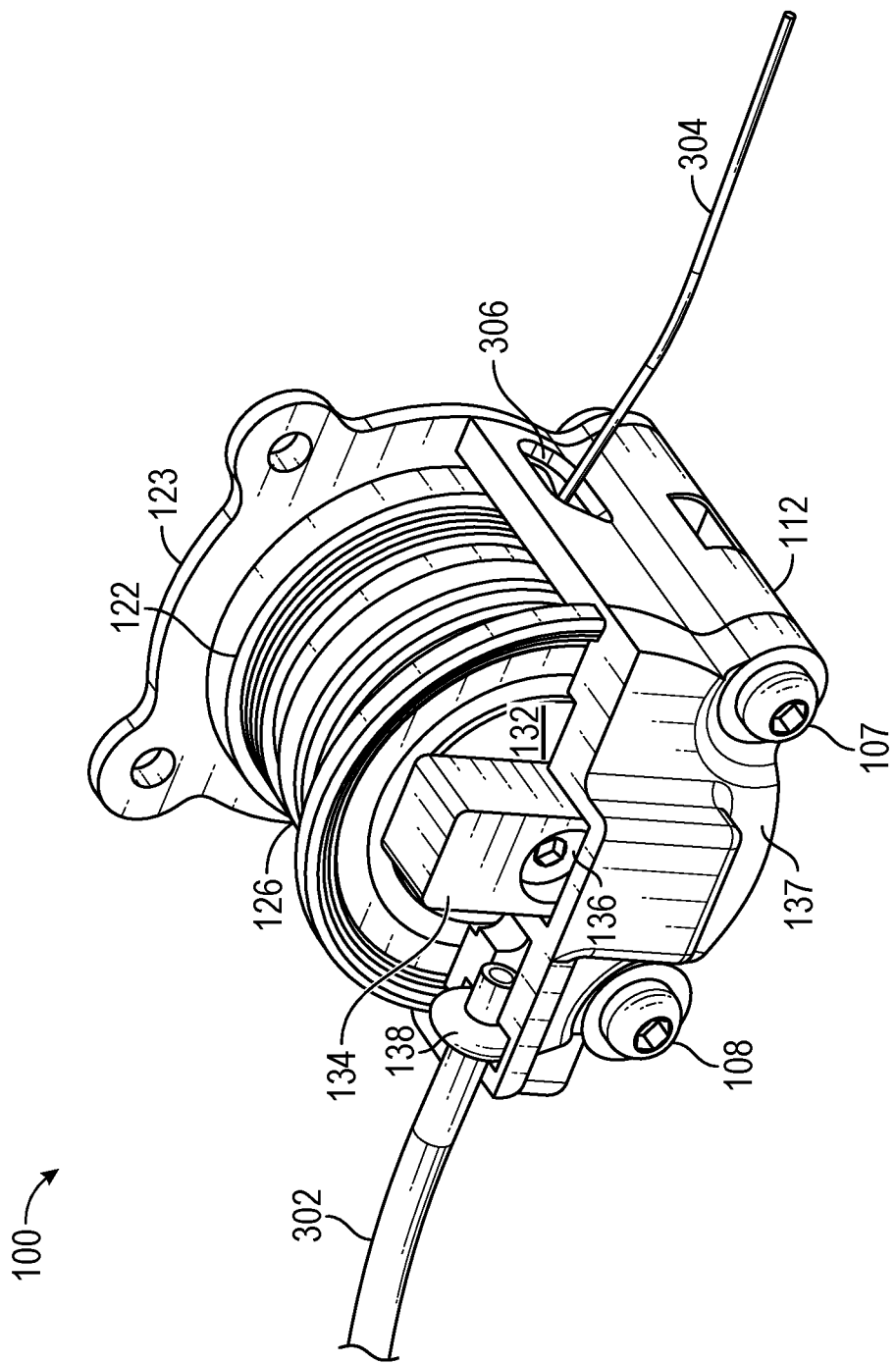
FIG. 3 is a cutaway perspective view of the force feedback actuator assembly of the embodiment of FIG. 1.

Referring now to FIG. 3, Tendon 304 is spooled about spring casing 122 and exits tendon aperture 306. The tendon is coupled to the spring casing such that when tendon 304 is placed under tension, the spring casing applies a torque to power spring assembly 140, thereby providing a restoring force to the tendon. Tendon 304 is preferably composed of a material with very high tensile strength and abrasion resistance, preferably a polyethelyne, floropolymer, nylon, or high strength thermoplastic. As the assembly rotates, power spring 124 is placed under tension, producing a retraction torque once tendon 304 is released and, while the tendon is extended, taking up any slack in tendon 304 such that it maintains an operable level of tension.

Referring again to FIG. 1, wave spring 121 separates power spring assembly 140 from the inner surface of arbor casing 123, ensuring that power spring assembly 140 is free to rotate without undue friction. Tabs 141-143 of spring casing 122 engage corresponding protrusions 113, 114 on the inner surface of main casing 112 to prevent excessive forward translation of power spring assembly 140.

The inner circumference of membrane 132 is compressed between brake pad carrier 131 and anti-rotation clip 134 to form a substantially airtight seal by means of fastener 136. Anti-rotation clip 134 is keyed to brake pad carrier 131 and outer casing 137, such that membrane assembly 150 (comprising brake pad carrier 131, membrane 132, and anti-rotation clip 134) may translate relative to outer casing 137 along the axis of rotation of retraction assembly 120, but may not rotate or translate about any other axis.

The outer circumference of membrane 132 is compressed between main casing 112 and outer casing 137 by means of fasteners 105-108, forming a substantially airtight seal. O-ring 138 assists in sealing the substantially airtight cavity formed by membrane 132, such that pneumatic inlet 139 (e.g., pneumatic line inlet) is the only means for air to flow into or out of said membrane cavity.

Figures 2A, 2B:
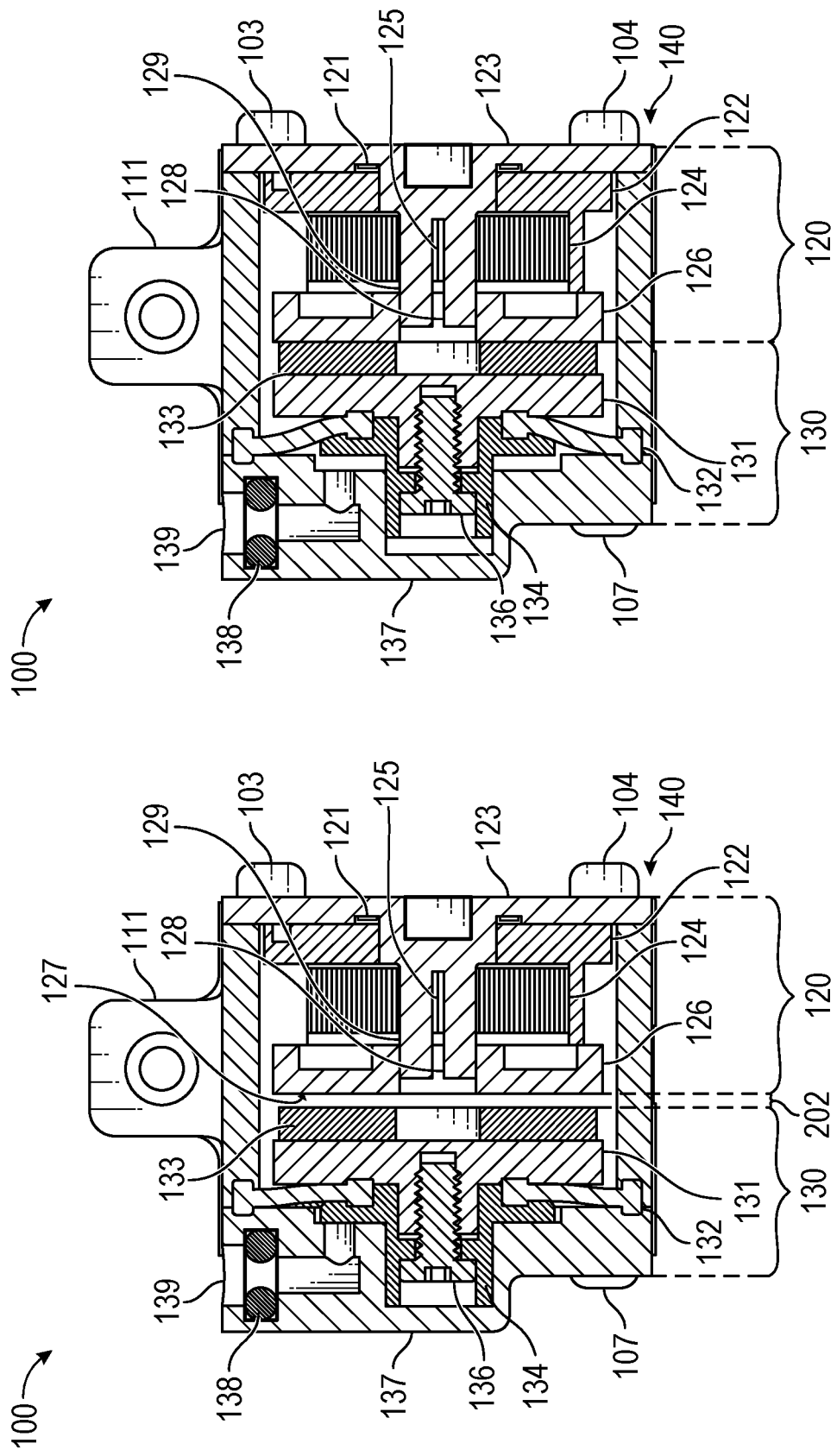
FIG. 2A is a cross sectional bottom view of the force feedback actuator assembly of the embodiment of FIG. 1 in an unactuated state.
FIG. 2B is a cross sectional bottom view of the force feedback actuator assembly of the embodiment of FIG. 1 in an actuated state.

FIGS. 2A and 2B show a cross-sectional bottom view of force feedback actuator assembly 100 of the embodiment of FIG. 1. In the unactuated state of FIG. 2A, a nominal gap between brake pad 133 of brake assembly 130 and rotor surface 127 of retraction assembly 120 allows substantially free rotation of power spring assembly 140 about the axis of arbor post 129. This, in turn, permits substantially uninhibited extension of tendon 304 (FIG. 3) under tension. Torque supplied by power spring 124 takes up excess slack in tendon 304.

In the actuated state of FIG. 2B, pneumatic pressure applied to membrane 132 via pneumatic inlet 139 causes membrane assembly 150 to translate toward retraction assembly 120, bringing brake pad 133 into contact with rotor surface 127. Friction produced by this contact applies a braking torque to power spring assembly 140, in turn producing a resistive force to the tensile loading of the tendon 304 (FIG. 3). When returning to the non-actuated state, the tensile stress of membrane 132 returning to its non-loaded state pulls brake pad 133 back, releasing it from the opposing side of the rotor surface 127 and allowing for unhindered extension of tendon 304 (FIG. 3).

A free end (not shown) of tendon 304 (FIG. 3) is coupled to a degree of freedom of a force feedback exoskeleton to provide variable resistance to the motion of a body part of a user to which the exoskeleton is coupled, as described in related U.S. Pat. No. 10,809,804. By way of example, tendon 304 (FIG. 3) may be coupled to a fingertip of a user, and force feedback actuator assembly 100 may be coupled to the opisthenar region of a user's hand by means of grounding tab 111 to provide variable resistance to the motion of a user's finger, as described in related U.S. Pat. No. 10,809,804.

In a preferred embodiment, brake pad 133 comprises a material with a high coefficient of friction and high abrasion resistance, preferably an elastomer and more preferably an EPDM rubber. Likewise, in a preferred embodiment membrane 132 is comprised of an elastomer, such as silicone rubber. In an alternative embodiment, brake pad 133 is formed from membrane 132 to reduce part count and facilitate easier assembly of membrane assembly 150. In a second alternative embodiment, brake pad 133 comprises one or more keyed features that can engage with the opposing face of rotor surface 127, which has corresponding female notch features, enhancing mechanical holding force in discrete hold positions.

In a further alternative embodiment, a force feedback actuator assembly comprises an additional friction surface beyond the interface of brake pad 133 and rotor surface 127. In one example, arbor casing 123 comprises a static friction surface that brake assembly 130 may make contact with during actuation. Said friction surface preferably comprises a material with a coefficient of friction less than or equal to that of brake pad 133. In a contemplated variation of said further alternative embodiment, arbor casing 123 and spring casing 122 comprise the primary static friction surface rather than brake pad 133 and rotor surface 127.

Referring again to FIGS. 1-3, the inventive structure and function of the actuator assembly may be described as a first rotating body (in the shown embodiments the rotating body comprises the spring casing cap 127, although any suitable rotating body may be used) coupled to a tendon and to a spring (e.g. the power spring 124). The spring is configured to produce a torque on the rotating body to provide a restoring force to the tendon when the tendon is pulled away from the rotating body. In some embodiments the rotating body is rotatably mounted to a casing of the actuator assembly (e.g. by the spring casing 122 and spring casing cap 126 rotatably mounted on the arbor post 129). In some embodiments the rotating body has a surface, such as the rotor surface 127 of the spring casing cap 126, that is configured to receive a braking force.

A second body of the actuator assembly, in some embodiments the brake assembly 130, and in particular the brake pad 133, is configured to apply a variable braking force to the rotating body when the rotating body is in contact with the second body, and apply no braking force when the rotating body is not in contact with the second body. In some embodiments the second body comprises the brake pad 133 that is coupled to the actuator assembly 100 such that the brake pad 133 can move between varied positions contacting the rotating body to apply variable forces and at least one position where the brake pad 133 does not contact the rotating body. In some embodiments the variable force is applied to the surface of the rotating body as a result of a membrane enclosing a volume fluidically coupled to at least one control valve and to a pressurized fluid source. In some embodiments the membrane is the membrane 132. In some embodiments the volume enclosed by the membrane is the membrane cavity 202. In some embodiments the pressurized fluid source is used to change the pressure in the volume, whereby there are at least two pressure states experienced by the volume. In some embodiments the at least two pressure states include a first pressure state which results in the second body being in contact with the rotating body and a second pressure state which results in the second body not being in contact with the rotating body.

Figure 4:
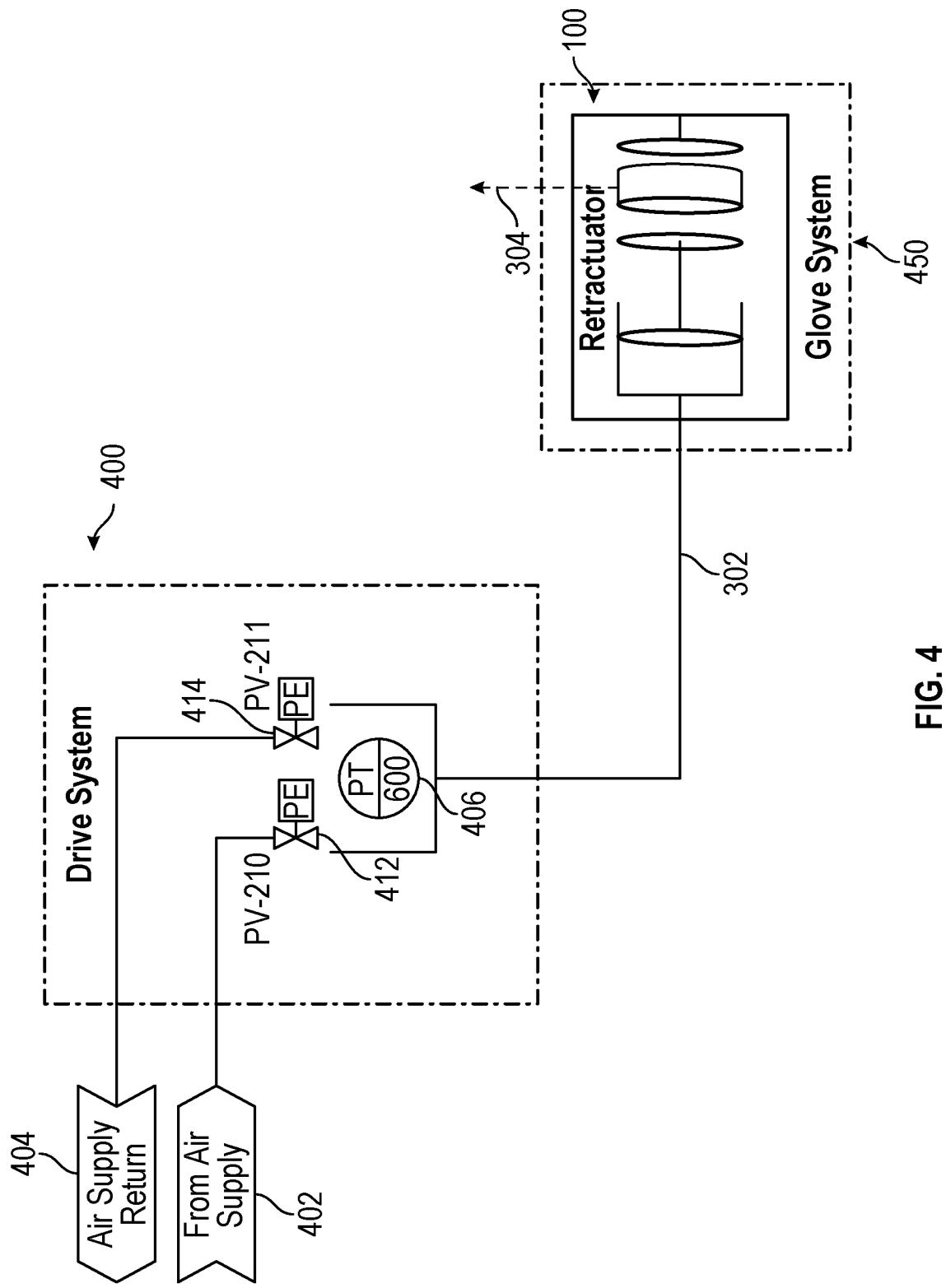
FIG. 4 is a block diagram of a control system of a force feedback actuator assembly in accordance with one embodiment.

FIG. 4 illustrates a block diagram of a control system of a force feedback actuator assembly in accordance with one embodiment. Force feedback actuator assembly 100, contained in haptic feedback glove 450, is coupled to drive system 400 via pneumatic tube 302. Drive system 400 comprises a first control valve 412 fluidically coupled to pneumatic tube 302 and to pressurized air supply 402. A second control valve 414 is fluidically coupled to pneumatic tube 302 and to air supply return 404. Pressure of the pneumatic volume defined by pneumatic tube 302 and membrane 132 (FIG. 1) is controlled by the action of control valves 412, 414 and sensed by pressure sensor 406. Closed loop control of the pressure of this volume enables controlled variation of the braking force applied by force feedback actuator assembly 100 to tendon 304.

In an alternative embodiment, control valves 412 and 414 may be replaced by a single 3/2 control valve. Pressure sensor 406 may also be omitted if closed-loop control is not desired. In a preferred embodiment, air supply return 404 is coupled to vacuum to increase the evacuation rate of the pneumatic volume of membrane 132 (FIG. 1). Said air supply return may also be coupled to atmosphere.

According to some embodiments, haptic feedback glove 450 provides an actuator assembly mechanically coupled to a tendon such that a length of the tendon extending from the actuator assembly is increasable and where an actuator of the actuator assembly is coupled to a pressurized fluid source configured to change pressure in an enclosed cavity of the actuator assembly. In some examples, haptic feedback glove 450 couples an end of the tendon extending from the actuator assembly to the external member.

According to some embodiments, drive system 400 activates the pressurized fluid source to provide a first pressure in the cavity, whereby the tensile force on the tendon is unaffected by the actuator when cavity has the first pressure. In some examples, drive system 400 activates the pressurized fluid source to provide a second pressure in the cavity different from the first pressure, whereby the actuator applies a braking force to the mechanical coupling, whereby tensile force on the tendon is affected by the actuator.

Figure 5:
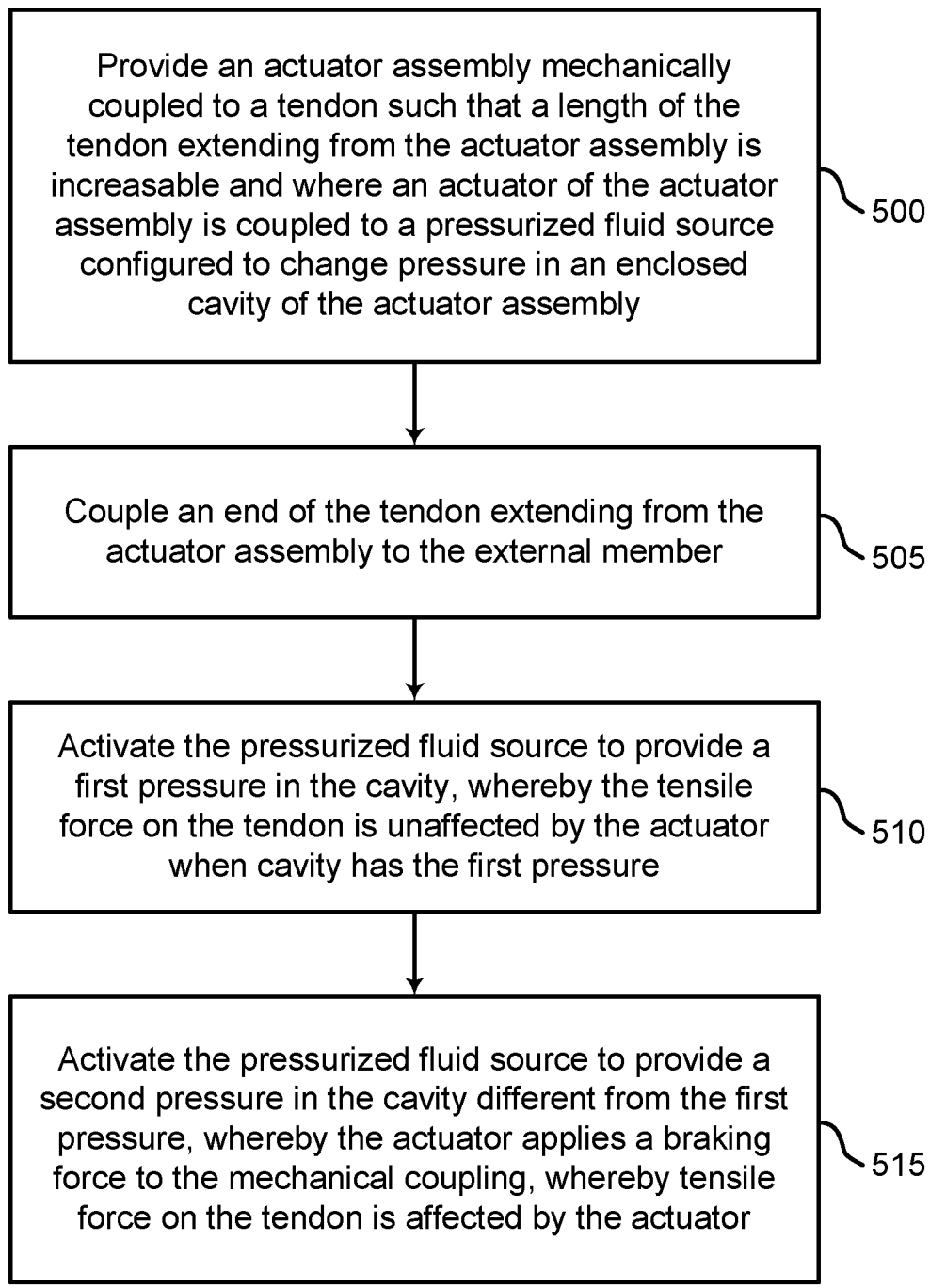
FIGS. 5 through 6 show examples of a process for providing haptic feedback to a hand using a force feedback exoskeleton according to aspects of the present disclosure.

FIG. 5 shows an example of a process for providing haptic feedback to a hand using a force feedback exoskeleton according to aspects of the present disclosure. In some examples, these operations are performed by a system including a processor executing a set of codes to control functional elements of an apparatus. Additionally, or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 500, the system provides an actuator assembly mechanically coupled to a tendon such that a length of the tendon extending from the actuator assembly is increasable and where an actuator of the actuator assembly is coupled to a pressurized fluid source configured to change pressure in an enclosed cavity of the actuator assembly. In some cases, the operations of this step refer to, or may be performed by, a haptic feedback glove as described with reference to FIG. 4.

At operation 505, the system couples an end of the tendon extending from the actuator assembly to the external member. In some cases, the operations of this step refer to, or may be performed by, a haptic feedback glove as described with reference to FIG. 4.

At operation 510, the system activates the pressurized fluid source to provide a first pressure in the cavity, whereby the tensile force on the tendon is unaffected by the actuator when cavity has the first pressure. In some cases, the operations of this step refer to, or may be performed by, a drive system as described with reference to FIG. 4.

At operation 515, the system activates the pressurized fluid source to provide a second pressure in the cavity different from the first pressure, whereby the actuator applies a braking force to the mechanical coupling, whereby tensile force on the tendon is affected by the actuator. In some cases, the operations of this step refer to, or may be performed by, a drive system as described with reference to FIG. 4.

Figure 6:
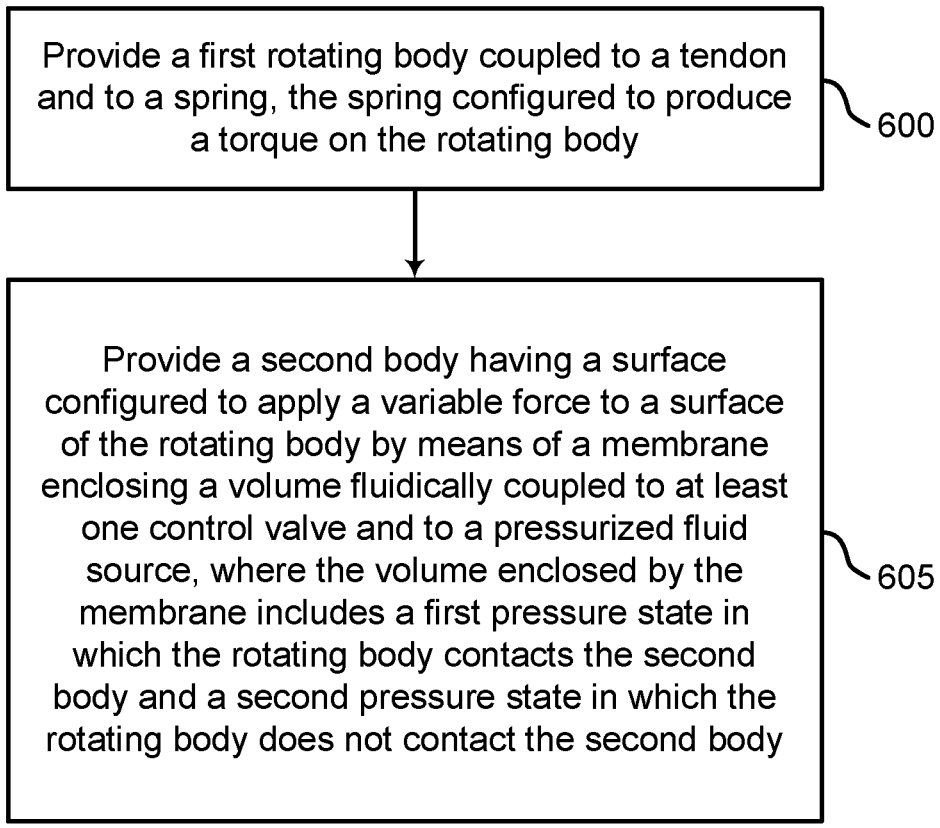

FIG. 6 shows an example of a process for providing haptic feedback to a hand using a force feedback exoskeleton according to aspects of the present disclosure. In some examples, these operations are performed by a system including a processor executing a set of codes to control functional elements of an apparatus. Additionally, or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 600, the system provides a first rotating body coupled to a tendon and to a spring, the spring configured to produce a torque on the rotating body. In some cases, the operations of this step refer to, or may be performed by, a rotating body, a tendon, and a spring as described with reference to FIGS. 1-3.

At operation 605, the system provides a second body having a surface configured to apply a variable force to a surface of the rotating body by means of a membrane enclosing a volume fluidically coupled to at least one control valve and to a pressurized fluid source, where the volume enclosed by the membrane includes a first pressure state in which the rotating body contacts the second body and a second pressure state in which the rotating body does not contact the second body. In some cases, the operations of this step refer to, or may be performed by, a brake assembly, a rotating body, a membrane, a control valve, and a pressurized air supply as described with reference to FIGS. 1-3.

Accordingly, the present disclosure includes the following embodiments.

An apparatus for providing haptic feedback to a hand using a force feedback exoskeleton is described. One or more embodiments of the apparatus include a first rotating body coupled to a tendon and to a spring, the spring configured to produce a torque on the rotating body and a second body having a surface configured to apply a variable force to a surface of the rotating body by means of a membrane enclosing a volume fluidically coupled to at least one control valve and to a pressurized fluid source, wherein the volume enclosed by the membrane comprises a first pressure state in which the rotating body contacts the second body and a second pressure state in which the rotating body does not contact the second body.

Some examples of the apparatus, system, and method further include an anti-rotation clip configured to prevent rotation of the second body. In some examples, the spring is coupled to a post about which the rotating body rotates.

In some examples, the rotating body is coupled to a wave spring configured to reduce rotational friction on the rotating body. In some examples, the rotating body comprises at least one tab configured to limit translation of the rotating body along its axis of rotation.

Some examples of the apparatus, system, and method further include a brake pad disposed between the surface of the first body and the surface of the second body configured to contact each other. In some examples, the brake pad is composed of an elastomer. In some examples, the elastomer is an EPDM rubber.

In some examples, the at least one control valve comprises a 3/2 valve. In some examples, the at least one control valve comprises a first 2/2 valve and a second 2/2 valve.

Some examples of the apparatus, system, and method further include a pressure sensor. In some examples, the at least one control valve is coupled to vacuum.

In some examples, the volume enclosed by the membrane further comprises a third pressure state in which the rotating body is contacting the second body with a lesser force than in the first pressure state. In some examples, the surface of the rotating body and the surface of the second body comprise at least one keyed feature configured to resist rotation of the rotating body. Some examples of the apparatus, system, and method further include a third body also configured to contact a surface of the rotating body.

In some examples, the actuator assembly is configured to be worn on the hand of a user. In some examples, the element worn on the hand which includes the actuator assembly comprises a haptic glove. In some examples, the at least one control valve is configured to be worn on the torso of a user. In some examples, the pressurized fluid source is further configured to be worn on the torso of a user. In some examples, the tendon is configured to be spooled about the rotating body.

A method for providing haptic feedback to a hand using a force feedback exoskeleton is described. One or more embodiments of the method include providing an actuator assembly mechanically coupled to a tendon such that a length of the tendon extending from the actuator assembly is increasable and wherein an actuator of the actuator assembly is coupled to a pressurized fluid source configured to change pressure in an enclosed cavity of the actuator assembly, coupling an end of the tendon extending from the actuator assembly to the external member, activating the pressurized fluid source to provide a first pressure in the cavity, whereby the tensile force on the tendon is unaffected by the actuator when cavity has the first pressure, and activating the pressurized fluid source to provide a second pressure in the cavity different from the first pressure, whereby the actuator applies a braking force to the mechanical coupling, whereby tensile force on the tendon is affected by the actuator.

Some of the functional units described in this specification have been labeled as modules, or components, to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While the invention herein disclosed has been described by means of specific embodiments, examples and applications thereof, numerous modifications and variations could be made thereto by those skilled in the art without departing from the scope of the invention set forth in the claims.

What is claimed is:

1. An actuator assembly for a force-feedback exoskeleton comprising:
   a first rotating body coupled to a tendon and to a spring, said spring configured to produce a torque on the rotating body; and
   a second body having a surface configured to apply a variable force to a surface of the rotating body by means of a membrane enclosing a volume fluidically coupled to at least one control valve and to a pressurized fluid source, wherein the volume enclosed by the membrane comprises:

a first pressure state in which the rotating body contacts the second body; and a second pressure state in which the rotating body does not contact the second body.

2. The actuator assembly of claim 1, further comprising: an anti-rotation clip configured to prevent rotation of the second body.

3. The actuator assembly of claim 1, wherein the spring is coupled to a post about which the rotating body rotates.

4. The actuator assembly of claim 1, wherein the rotating body is coupled to a wave spring configured to reduce rotational friction on the rotating body.

5. The actuator assembly of claim 1, wherein the rotating body comprises at least one tab configured to limit translation of the rotating body along its axis of rotation.

6. The actuator assembly of claim 1, wherein a brake pad is disposed between the surface of the first body and the surface of the second body configured to contact each other.

7. The actuator assembly of claim 6, wherein the brake pad is composed of an elastomer.

8. The actuator assembly of claim 7, wherein the elastomer is an EPDM rubber.

9. The actuator assembly of claim 1, wherein the at least one control valve comprises a 3/2 valve.

10. The actuator assembly of claim 1, wherein the at least one control valve comprises a first 2/2 valve and a second 2/2 valve.

11. The actuator assembly of claim 1, further comprising a pressure sensor.

12. The actuator assembly of claim 1, wherein said at least one control valve is coupled to vacuum.

13. The actuator assembly of claim 1, wherein the volume enclosed by the membrane further comprises a third pressure state in which the rotating body is contacting the second body with a lesser force than in the first pressure state.

14. The actuator assembly of claim 1, wherein said surface of the rotating body and said surface of the second body comprise at least one keyed feature configured to resist rotation of the rotating body.

15. The actuator assembly of claim 1, further comprising a third body also configured to contact a surface of the rotating body.

16. The actuator assembly of claim 1, wherein the actuator assembly is configured to be worn on the hand of a user.

17. The actuator assembly of claim 1, wherein the element worn on the hand which includes the actuator assembly comprises a haptic glove.

18. The actuator assembly of claim 16, wherein the at least one control valve is configured to be worn on the torso of a user.

19. The actuator assembly of claim 18, wherein the pressurized fluid source is further configured to be worn on the torso of a user.

20. The actuator assembly of claim 1, wherein the tendon is configured to be spooled about the rotating body.

\* \* \* \* \*